(12) United States Patent
Segal (10) Patent No.: US 12,513,203 B2
(45) Date of Patent: Dec. 30, 2025

(54) SYSTEM AND METHOD FOR VIRTUAL PRODUCT AND SERVICE PRESENTATION

(71) Applicant: Touchcast, Inc., New York, NY (US)

(72) Inventor: Edo Segal, Even Yehuda (IL)

(73) Assignee: Touchcast, Inc., New York, NY (US)

( * ) Notice: Subject to any disclaimer, the term of this patent is extended or adjusted under 35 U.S.C. 154(b) by 183 days.

(21) Appl. No.: 18/406,028

(22) Filed: Jan. 5, 2024

(65) Prior Publication Data

US 2024/0236162 A1 Jul. 11, 2024

Related U.S. Application Data

(60) Provisional application No. 63/478,550, filed on Jan. 5, 2023.

(51) Int. Cl.
*H04N 21/478* (2011.01)
*H04L 65/402* (2022.01)
*H04L 65/403* (2022.01)

(52) U.S. Cl.
CPC .......... *H04L 65/403* (2013.01); *H04L 65/402* (2022.05); *H04N 21/47815* (2013.01)

(58) Field of Classification Search
CPC ................ H04L 65/403; H04L 65/402; H04N 21/47815
See application file for complete search history.

(56) References Cited

U.S. PATENT DOCUMENTS

| | | |
|---|---|---|
| 9,363,448 B2 | 6/2016 | Segal |
| 9,661,256 B2 | 5/2017 | Segal et al. |
| 9,787,945 B2 | 10/2017 | Segal |
| 10,033,967 B2 | 7/2018 | Segal |
| 10,075,676 B2 | 9/2018 | Segal |
| 10,356,363 B2 | 7/2019 | Segal |
| 10,523,899 B2 | 12/2019 | Segal |
| 10,531,044 B2 | 1/2020 | Segal |
| 10,757,365 B2 | 8/2020 | Segal |
| 10,911,716 B2 | 2/2021 | Segal |
| 11,310,463 B2 | 4/2022 | Segal |
| 11,405,587 B1 | 8/2022 | Segal |
| 11,488,363 B2 | 11/2022 | Segal |
| 2016/0357358 A1* | 12/2016 | Forster ................ G06F 3/04845 |
| 2018/0352194 A1 | 12/2018 | Segal et al. |
| 2019/0026288 A1* | 1/2019 | Piroddi ............... G06F 16/9535 |
| 2021/0306595 A1 | 9/2021 | Segal |

\* cited by examiner

*Primary Examiner* — Amal S Zenati
(74) *Attorney, Agent, or Firm* — Leason Ellis LLP (57) ABSTRACT

Sequences of video content are categorized, wherein each of the respective sequences of video content relates to the others and comprises a plurality of video files. Each of the plurality of video files is a discrete section of at least one of the respective sequences of video content. A first selection representing a sequence of video content is received. A first video file is provided and a second video file is provided via a graphical user interface. A second selection representing a sequence is received and, in response, a second video file comprised in the second selected sequence is identified. Moreover, the second video file comprised in the second selected sequence is provided, wherein providing the second of the plurality video files comprised in the second selected one of the plurality of respective sequences of video content appears seamlessly.

20 Claims, 10 Drawing Sheets

SYSTEM AND METHOD FOR VIRTUAL PRODUCT AND SERVICE PRESENTATION

CROSS-REFERENCE TO RELATED APPLICATIONS

This application is based on, claims priority, and incorporates by reference U.S. Provisional Patent Application No. 63/478,550, filed Jan. 5, 2023. This application further incorporates by reference U.S. Provisional Patent Application No. 63/296,832, filed Jan. 5, 2022, as well as U.S. Provisional Patent Application No. 63/296,693, filed Jan. 5, 2022, which incorporates by reference U.S. patent application Ser. No. 17/567,699, filed Jan. 3, 2022, now U.S. Pat. No. 11,405,587, issued Aug. 2, 2022, which is a continuation-in-part of U.S. patent application Ser. No. 17/165,674, filed Feb. 2, 2021, which is a continuation of U.S. patent application Ser. No. 16/508,058, filed Jul. 10, 2019, now U.S. Pat. No. 10,911,716, issued Feb. 2, 2021; further, U.S. patent application Ser. No. 16/508,058 is a continuation of U.S. patent application Ser. No. 16/134,638, filed Sep. 18, 2018, now U.S. Pat. No. 10,356,363, issued Jul. 16, 2019, which is based on and claims priority to U.S. Patent Application No. 62/559,972, filed Sep. 18, 2017 and U.S. Patent Application No. 62/565,094, filed Sep. 28, 2017; further, U.S. patent application Ser. No. 16/134,638, is a continuation-in-part of U.S. patent application Ser. No. 15/683,403, filed Aug. 22, 2017, now U.S. Pat. No. 10,033,967, issued Jul. 24, 2018, which is a continuation of U.S. patent application Ser. No. 15/247,534, filed Aug. 25, 2016, now U.S. Pat. No. 9,787,945, issued Oct. 10, 2017, which is based on and claims priority to U.S. Patent Application No. 62/209,727, filed Aug. 25, 2015, U.S. Patent Application No. 62/242,029, filed Oct. 15, 2015, and U.S. Patent Application No. 62/329,081, filed Apr. 28, 2016; still further, U.S. patent application Ser. No. 15/247,534 is a continuation-in-part of U.S. patent application Ser. No. 14/833,984, filed Aug. 24, 2015, now U.S. Pat. No. 9,661,256, issued May 23, 2017, which is a continuation-in-part of U.S. patent application Ser. No. 14/316,536, filed Jun. 26, 2014, now U.S. Pat. No. 9,363,448, issued Jun. 7, 2016, which claims priority to U.S. Patent Application No. 61/839,757, filed Jun. 26, 2013 and U.S. Patent Application No. 61/845,743, filed Jul. 12, 2013, the contents of all of which are incorporated by reference in their respective entireties, as if set forth expressly herein.

This application further incorporates by reference U.S. patent application Ser. No. 17/001,047, filed Aug. 24, 2020, which is a continuation of U.S. patent application Ser. No. 16/537,201, filed Aug. 9, 2019, now U.S. Pat. No. 10,757,365, issued Aug. 25, 2020, which claims priority to U.S. Patent Application No. 62/716,925, filed on Aug. 9, 2018 and is a continuation-in-part of U.S. patent application Ser. No. 16/192,120, filed Nov. 15, 2018, now U.S. Pat. No. 10,523,899, issued on Dec. 31, 2019, which is a continuation-in-part of U.S. patent application Ser. No. 15/999,221, filed Aug. 15, 2018, which is based on and claims priority to U.S. Patent Application No. 62/545,994, filed Aug. 15, 2017; further, U.S. patent application Ser. No. 15/999,221 is a continuation-in-part of U.S. patent application Ser. No. 16/002,701, filed Jun. 7, 2018, now U.S. Pat. No. 10,531,044, issued on Jan. 7, 2020, which is a continuation of U.S. patent application Ser. No. 15/867,639, filed Jan. 10, 2018, now U.S. Pat. No. 10,075,676, issued on Sep. 11, 2018, which claims priority to U.S. Patent Application No. 62/444,525, filed Jan. 10, 2017, U.S. Patent Application No. 62/545,994, filed Aug. 15, 2017, and U.S. Patent Application No. 62/565,094, filed Sep. 28, 2017; further, U.S. patent application Ser. No. 15/999,221 is a continuation-in-part of U.S. patent application Ser. No. 16/002,668, filed Jun. 7, 2018, the contents of all of which are incorporated by reference in their respective entireties, as if set forth herein.

Moreover, this application incorporates by reference U.S. patent application Ser. No. 16/820,573, filed Mar. 16, 2020, which is claims priority to U.S. Patent Application Ser. No. 62/819,501, filed Mar. 15, 2019, U.S. Patent Application No. 62/832,751, filed Apr. 11, 2019, U.S. Patent Application No. 62/833,396, filed Apr. 12, 2019, and U.S. Patent Application No. 62/858,143, filed Jun. 6, 2019, all of which are incorporated by reference in their respective entireties, as if expressly set forth herein.

FIELD

The present disclosure relates, generally, to content presentation and, more particularly, to a system and method for providing and interacting with content via interactive communication sessions.

BACKGROUND

Although products and services are often offered for presentation and sale in virtual environments (e.g., over the Internet), users may not be well informed of respective offerings, at least partly because viewing products/services on a website is not an effective substitute for physically interacting with a product and/or with a person who has particular knowledge and expertise.

It is with respect to these and other considerations that the disclosure made herein is presented.

BRIEF SUMMARY

In one or more implementations, a computer-implemented system and method are disclosed for providing interactive video content. Each of the plurality of distinct and respective sequences of video content is categorized, wherein each of the respective sequences of video content relates to the other of the plurality of distinct and respective sequences of video content via at least one category. Further, each of the respective sequences of video content comprises a plurality of video files, and each of the plurality of video files is a discrete section of at least one of the respective sequences of video content. At least one computing device provides, via a graphical user interface, a prompt for ones of the plurality of distinct and respective sequences of video content. In response to the prompt via the graphical user interface, a first selection representing a first selected one of the plurality of respective sequences of video content is received. In response to the first selection, a first video file of the plurality video files comprised in the first selected one of the plurality of respective sequences of video content is provided via the graphical user interface. Moreover, a second video file of the plurality video files comprised in the first selected one of the plurality of respective sequences of video content is provided via the graphical user interface. In response to the prompt, a second selection representing a second selected one of the plurality of respective sequences of video content is received and, in response, at least one computing device identifies a second video file of the plurality of video files comprised in the second selected one of the plurality of respective sequences of video content that corresponds to the second video file of the plurality video files comprised in the first selected one of the plurality of respective sequences of video content. Moreover, the second of the plurality video files comprised in the second selected one of the plurality of respective sequences of video content is provided, wherein providing the second of the plurality video files comprised in the second selected one of the plurality of respective sequences of video content appears seamlessly.

In one or more implementations of the present disclosure, the first selected one and the second selected one of the plurality of respective sequences of video content regards a product and/or service offered for sale.

In one or more implementations of the present disclosure, at least one computing device provides, via a graphical user interface, a prompt for an interactive video conference with a person.

In one or more implementations of the present disclosure, at least one computing device provides, via the graphical user interface, the interactive video conference with the person.

In one or more implementations of the present disclosure, video content is provided via hypertext transport protocol live streaming.

In one or more implementations of the present disclosure, at least one computing device generates, in response to receiving the first selection representing a first selected one of the plurality of respective sequences of video content, a playlist of video files comprised in the first selected one of the plurality of respective sequences of video content. The first video file and the second video file of the plurality video files comprised in the first selected one of the plurality of respective sequences of video content are provided via the playlist.

In one or more implementations of the present disclosure, the first selected one of the plurality of respective sequences of video content is provided in a first order.

In one or more implementations of the present disclosure, the second selected one of the plurality of respective sequences of video content is provided in reverse of the first order.

In one or more implementations of the present disclosure, at least one computing device converts each of the first and second selected ones of the plurality of respective sequences of video content from a first format to a second format.

In one or more implementations of the present disclosure, the first format is MP4 and the second format is TS.

Other features of the present application are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of overview and introduction, the present disclosure provides systems and methods for facilitating, managing, and providing interactive video content, including in connection with e-commerce applications and product and/or service (hereinafter "product/service") offerings provided via internet web sites. In one or more implementations, interactive product/service presentation is provided for a user of a computing device, which includes virtual access to one or more products in one or more one or more stages. In a first stage, for example, a user (e.g., a potential buyer) is presented an interactive video that provides virtual access to a product/service, including to view, hear, or otherwise sample the product/service dynamically. The user can interact with the video using one or more graphical screen controls provided via a graphical user interface in the website (or other suitable computing application) or using physical device options available to the user. In one or more implementations, graphical screen controls, such as buttons, scrollbars, or the like, can be selected in a graphical user interface for accessing interactive video content representing the product/service. In addition (or in the alternative), physical aspects of a computing device, such as a touchpad, touchscreen, mouse, stylus, or other suitable device or feature, is usable for accessing the interactive video content.

In an example first stage, a user of a computing device connects to an internet web page using a web browser software application, which can be configured by software such as one or more of plug-ins, scripts, applets, servlets, or other suitable ways. Once connected, video of the product/service can be provided in at least a portion of the web page or in other suitable way, such as via a link to the content. Furthermore, one or more options can be provided for the user to select and, thereafter, be provided with virtual access to the product/service in a second stage, which can include a live video conference with a salesperson who can provide additional information regarding the product/service as well as options and functionality for purchase. The second stage interactive video conferencing can be provided via an allocated GPU instance of a virtual machine, for example, running on a computing device remotely located (e.g., in the "cloud"). Accordingly, any device that is connected to the respective GPU instance will view substantially the same content. Details of a second stage are provided herein.

In one or more implementations of the present disclosure, a web site or other application includes an embedded player that can provide video content via HTTP live streaming ("HLS"). In one or more implementations, a hypertext markup language ("HTML") inline frame element ("iframe"), can be used to embed HTML content (e.g., for video playback) into a respective HTML web page that is hosted on one or more computing devices on the internet. A plurality of streams can be provided via HLS, each of stored video content of a product/service and including a number of video files sequentially played via respective playlists. For example, a video shows an automobile via panning from left to right. Each two or three seconds of panning can be provided in a single video file, such as formatted as a video transport stream ("TS") file, and a playlist of respective TS files is used to play a sequence of 15 or more TS files to fully animate panning from left to right. In addition, a combination of video files can similarly show panning from right to left, in the opposite direction, also as a function of a predetermined playlist. Accordingly, panning from left to right can be provided via a playlist of respective video files, each illustrating camera movement in a particular direction, and panning from right to left can be provided via a playlist of a number of other video files showing movement in the opposition direction (e.g., right to left).

Accordingly, the present disclosure provides for video content that shows movement (e.g., camera movement, product movement, background movement, other movement, or a combination thereof) including to present a product/service. Selections of a product/service, such as a particular make, model, color, or other particulars of a car, can be made in a graphical user interface provided in an internet web page or other suitable application. Thereafter, a playlist of video files can be played to show video of the respective product/service, as represented by the respective selections.

As a respective playlist of video files plays, for example, to show a respectively configured product/service panned from left to right, one or more controls can be selected by the user (e.g., one or more selections of graphical screen controls in an internet web page) to alter the configuration of the product/service. For example, selections can be made to change the color or model of a product. Information representing the selections can be transmitted to a computing device, such as a data processing apparatus 102 (FIG. 1), which can result in a new playlist of video files that show the newly configured product. More particularly, information (e.g., metadata) that represents details of the newly configured product, as well as a respective video file that was playing when the new selection(s) were made, can be transmitted to a data processing apparatus 102. For example, the metadata or other information transmitted to a data processing apparatus 102 can represent a playlist of video files that was playing at the time of the new selection(s), including that shows panning from left to right. Using the received information, a new playlist can be provided for playing different video content of the newly configured product, including by showing the newly configured product in the same location and with camera angles and movement (e.g., panning) continuing from the same point from where the previous video of the previously configured product was at the time the new selections were made.

By processing information representing a particularly configured product/service, as well as information representing a video playlist and/or a video file that had been playing at the time when changes in product/service configurations were made, the user is provided with a dynamic video steam that presents changes, for example, in product/service configurations, smoothly and seamlessly. For example, a product is virtually provided in video via a playlist of video files in which a camera appears to pan from left to right. While the video plays, a user selects a graphical screen button, "reverse," that results in an updated playlist of video files in which the same product is virtually provided, except panned from right to left. Information representing the brief (e.g., 2 second) respective video file that was playing at the time of the selection of the "reverse" button can be used to generate the new playlist in which the substantially same initial view of the product is shown in the first video file in the playlist, with subsequent video files showing the product panning in the opposite direction, i.e., from right to left. Changes in product/service configurations, as well as changes to camera movement, product movement, or other kinds or items of movement can appear dynamically in video in response to selections and associated information being transmitted and processed, all without significant CPU and GPU processing requirements otherwise associated, for example, with pixel streaming or other graphical processes that significantly higher computing resources. The result is a graphically appealing video interface which appears to provide dynamic interactivity, such as provided by pixel streaming applications, that requires far less computing resources, such as GPU and CPU processing due to technical architecture of the present disclosure in which selections and playlists of video files can be generated dynamically and substantially in real-time during operation.

Accordingly, in one or more implementations the present disclosure can provide a number of a plurality of video files, each representing a small section in a larger timeline included in the number of video files and which are presented to a user computing device in a graphical user interface. As a user makes selections in the graphical user interface, such as to change a variable (e.g., vehicle color, chassis options, wheel and tire configurations, camera movement, or other variable), changes appear automatically in the video content dynamically and substantially in real-time. Multiple videos can be hosted on one or more remote computing devices (e.g., file servers), each video providing a respective product characteristic (color, style, etc.), having the same respective timelines (or playlists). In one or more implementations, the video files include at least some computer generated imagery ("CGI") to present a virtual representation of a product/service. The video files can be formatted in various ways, such as MP4 or other video format and, thereafter, converted for HLS or other suitable service, such as to .TS files. In one or more implementations, video files can be parsed into short fragments, which play in accordance with a playlist. During playback as one or more selections are made by a user, such as to change product color, a current file name and fragment (e.g., fragment number) can be identified and then a selection of a different fragment (e.g., different file name but same fragment number), is selected for playback. The result is a seamless change in video content, such as changes in product color or style, while eliminating a need for pixel streaming or other GPU and CPU intensive resource requirements.

Figure 1:
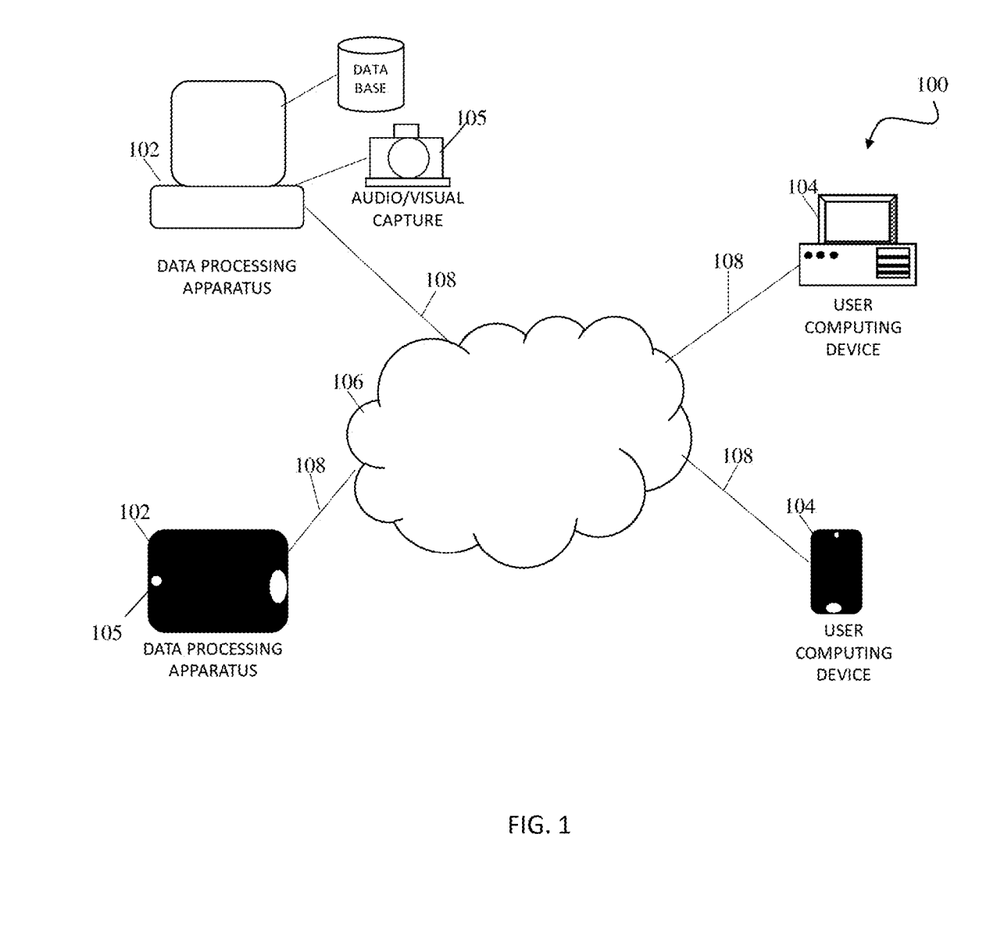
FIG. 1 is a diagram illustrating an example hardware arrangement that operates for providing the systems and methods disclosed herein.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present disclosure, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present disclosure provides improved processing techniques to prevent packet loss, to improve handling interruptions in communications, and other issues associated with wireless technology.

According to an embodiment of the present disclosure, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
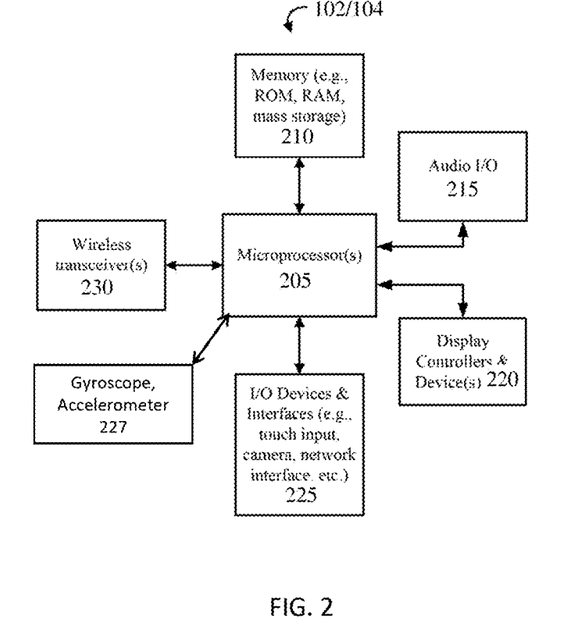
FIG. 2 is a block diagram that illustrates functional elements of a computing device in accordance with an implementation of the present disclosure.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G, 5G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present disclosure provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present disclosure, at least in part, for establishing and controlling media sessions between various end points, including user computing devise 104, Internet media extender 110 and data processing apparatus 102.

In addition to RTSP, one or more implementations of the present disclosure can be configured to use Web Real-Time Communication ("WebRTC") to support browser-to-browser applications, including in connection with voice, video chat, and peer-to-peer ("P2P") file sharing. Thus, the present disclosure avoids a need for either internal or external plugins to connect endpoints, including for voice/video or other communication sharing. In one or more implementations, the present disclosure implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present disclosure can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD")

video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
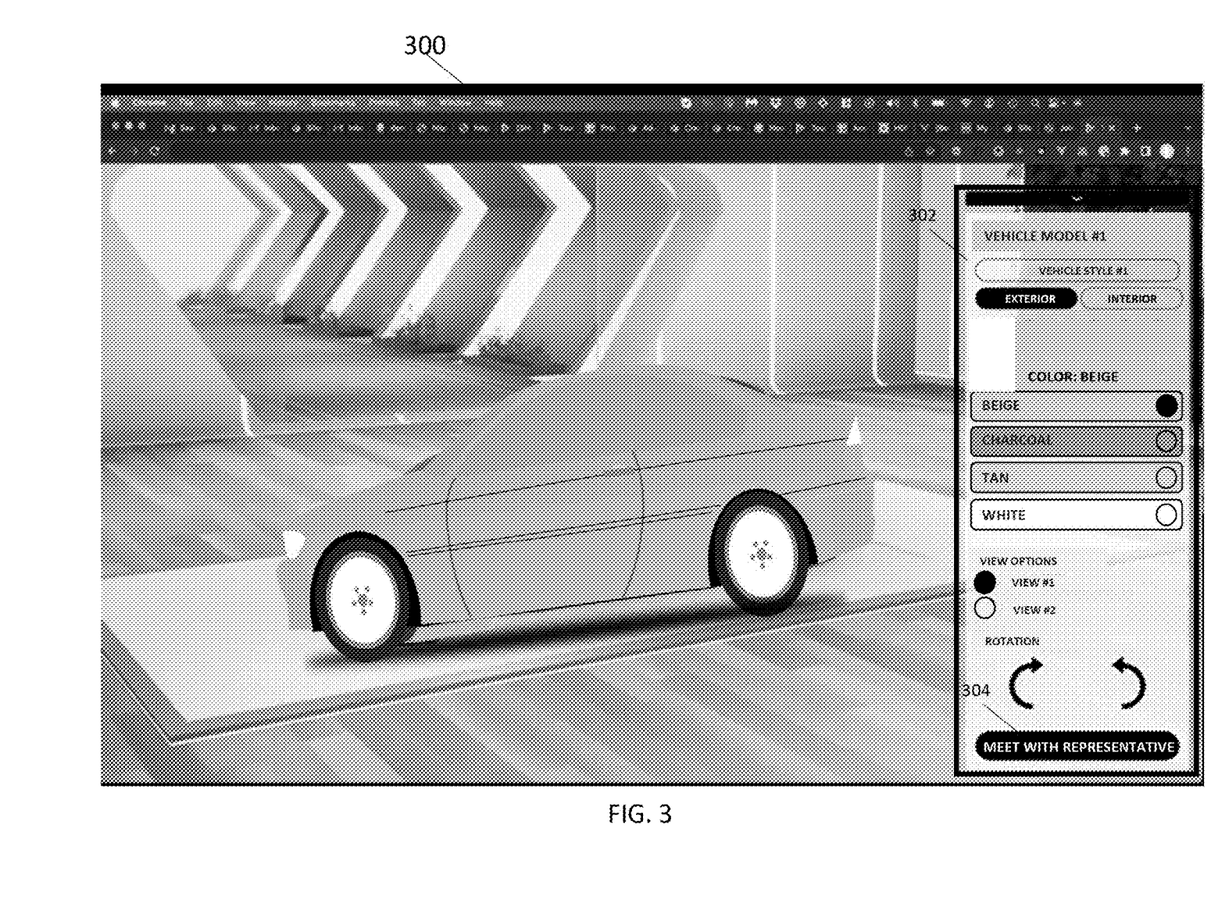
FIGS. 3-7 are example screen displays illustrating a graphical user interface that includes selectable options for defining various characteristics of a product, such as model, style, colors, and that includes an embedded video player and selectable options for video play, such as view options, in accordance with an implementation of the present disclosure.
Figure 4:
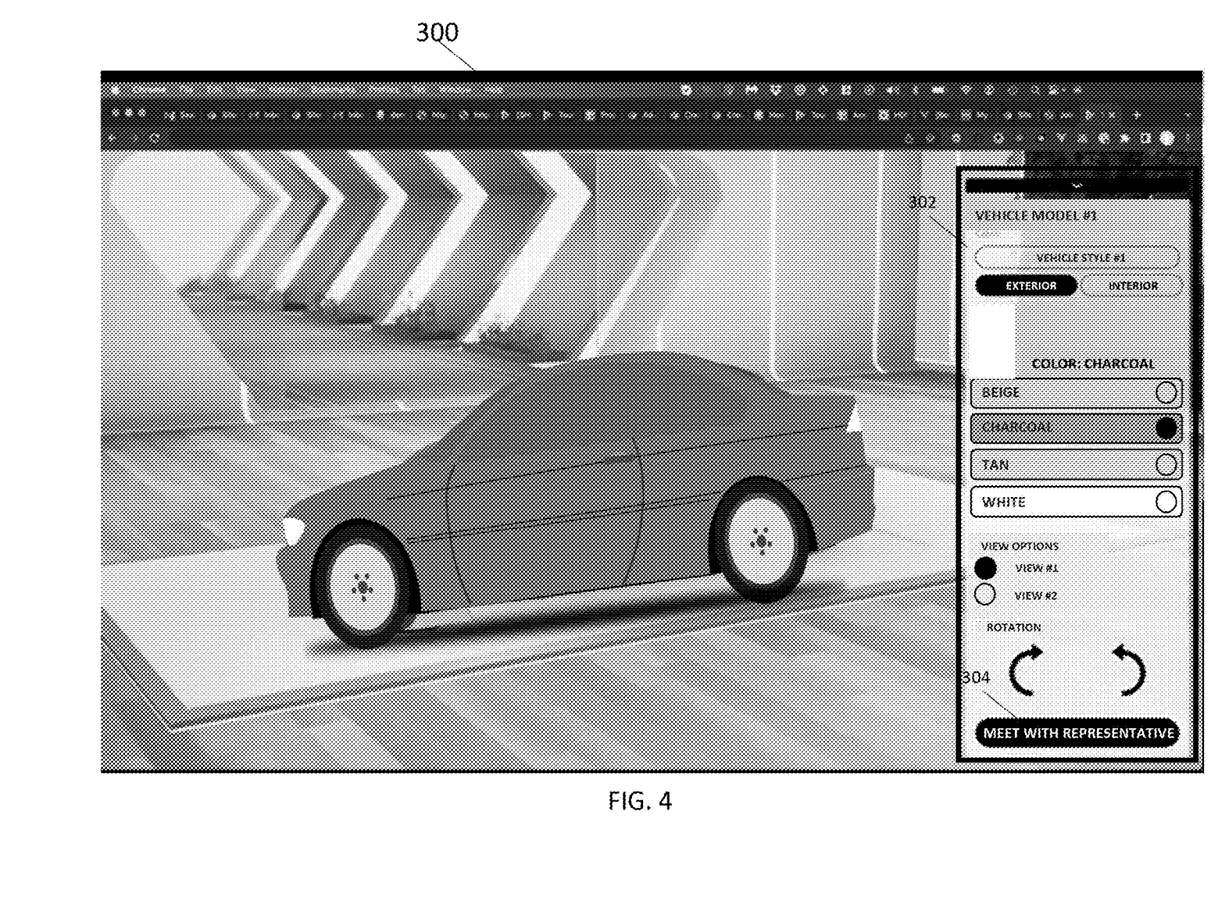
Figure 5:
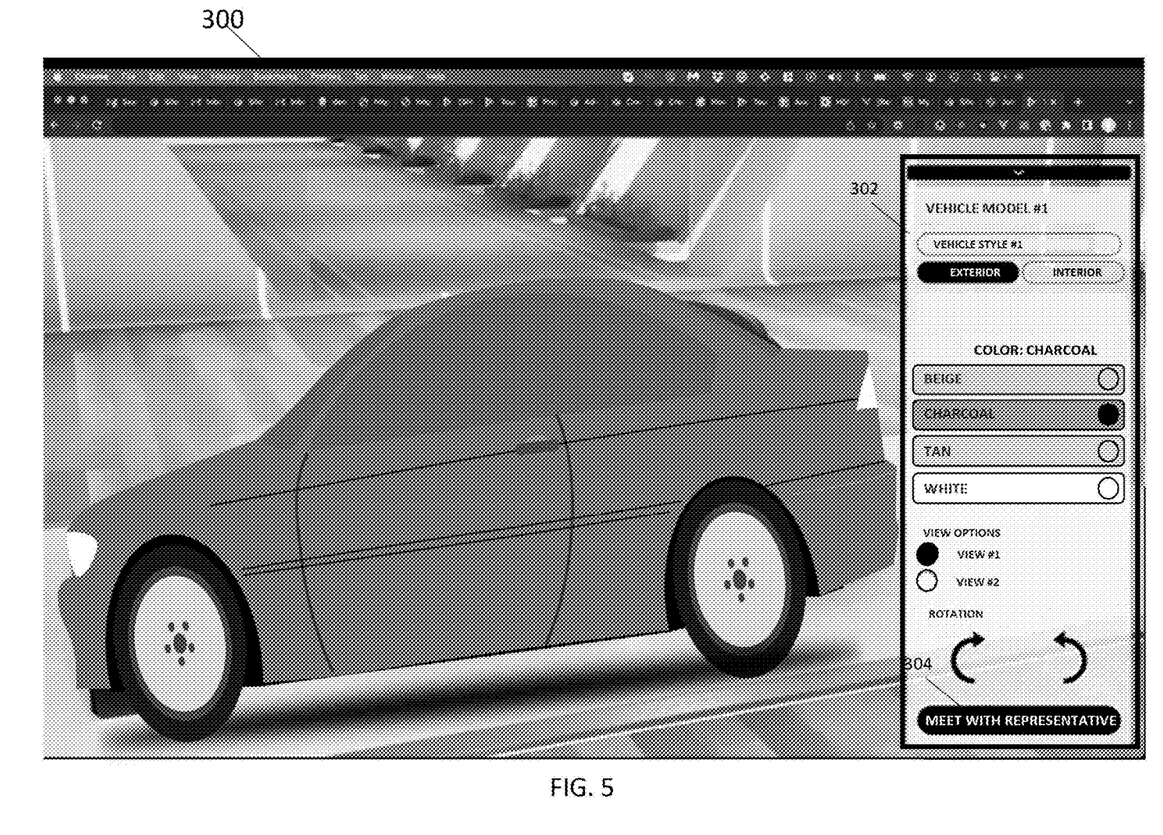
Figure 6:
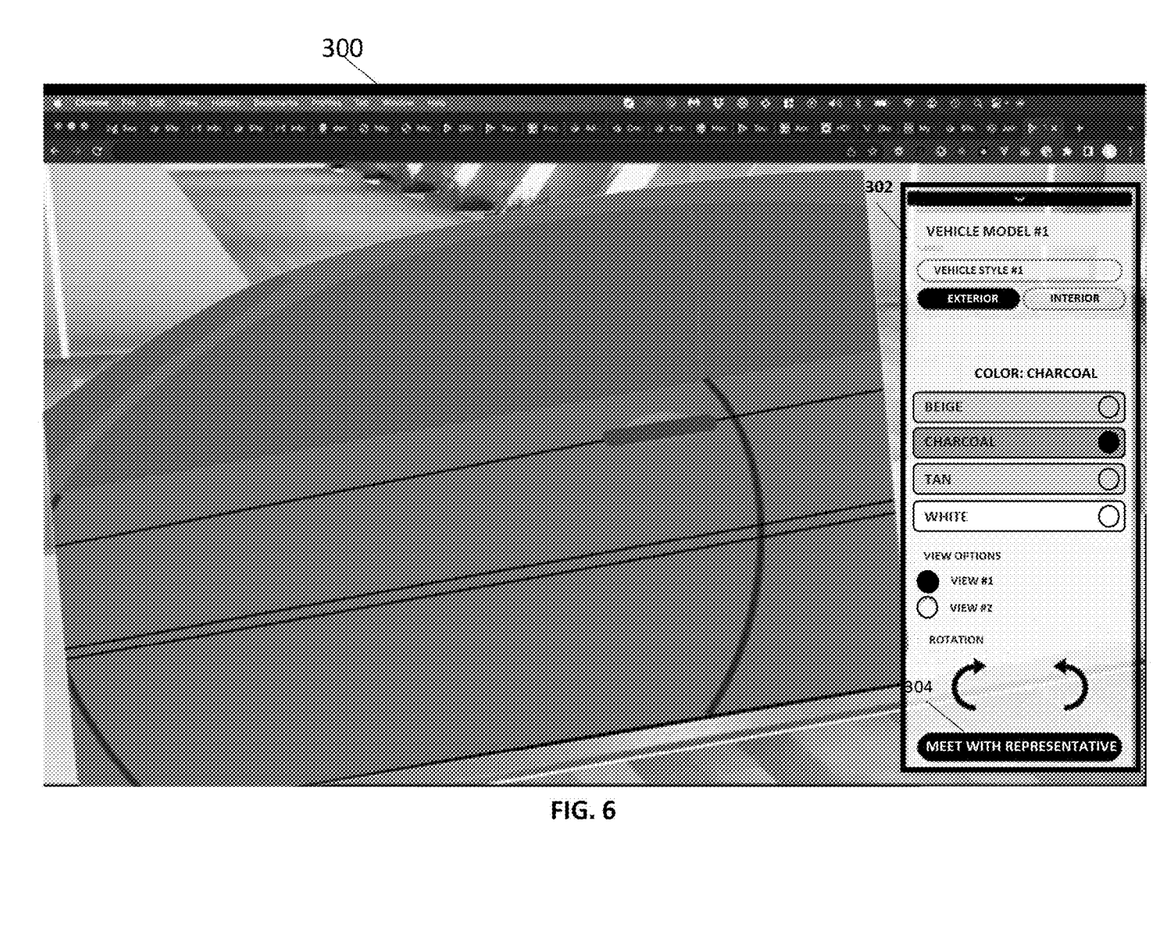

Referring now to FIGS. 3-7, an example graphical user interface ("GUI") 300 is shown that includes embedded video playback of an automobile in an Internet website, in accordance with an implementation of the present disclosure. The example graphical user interface shown in FIGS. 3-7 includes selectable options in section 302 for a user to define various features of the automobile, such as model, vehicle style, interior colors, exterior colors and view options. In operation, after a respective vehicle has been selected information representing the vehicle is transmitted to data processing apparatus 102 and a video playlist is generated that results in video content being presented in GUI 300. For example, and as illustrated in FIG. 3, a beige colored vehicle is presented and camera panning from left to right is shown. As additional selections are made, such as a change in color from beige to charcoal, information is transmitted to data processing apparatus 102 for a new playlist to be generated and used to provide updated video content of the vehicle in charcoal color. In addition, information representing the particular video fragment that was presented at the time of the selection changing the color from beige to charcoal is transmitted to data processing apparatus 102, which is used to select a respective fragment from which video playback of the charcoal-colored vehicle is shown. In this way, a seamless transition from the vehicle panning from left to right in a beige color to a charcoal color is provided to the user.

As noted herein, in addition to vehicle or other product selections, the present disclosure supports a vast array of camera angles and viewpoints in moving video for a user. For example and as shown in a sequence of frames represented in FIGS. 4-6, camera zooming of the charcoal-colored vehicle is demonstrated, which enables the user to appreciate fine details of the product. In addition to selectable graphical screen controls, such as buttons, sliders, or the like, a user can make selections (such as to zoom in and out) using a trackpad, touchscreen, or other suitable interface.

Figure 7:
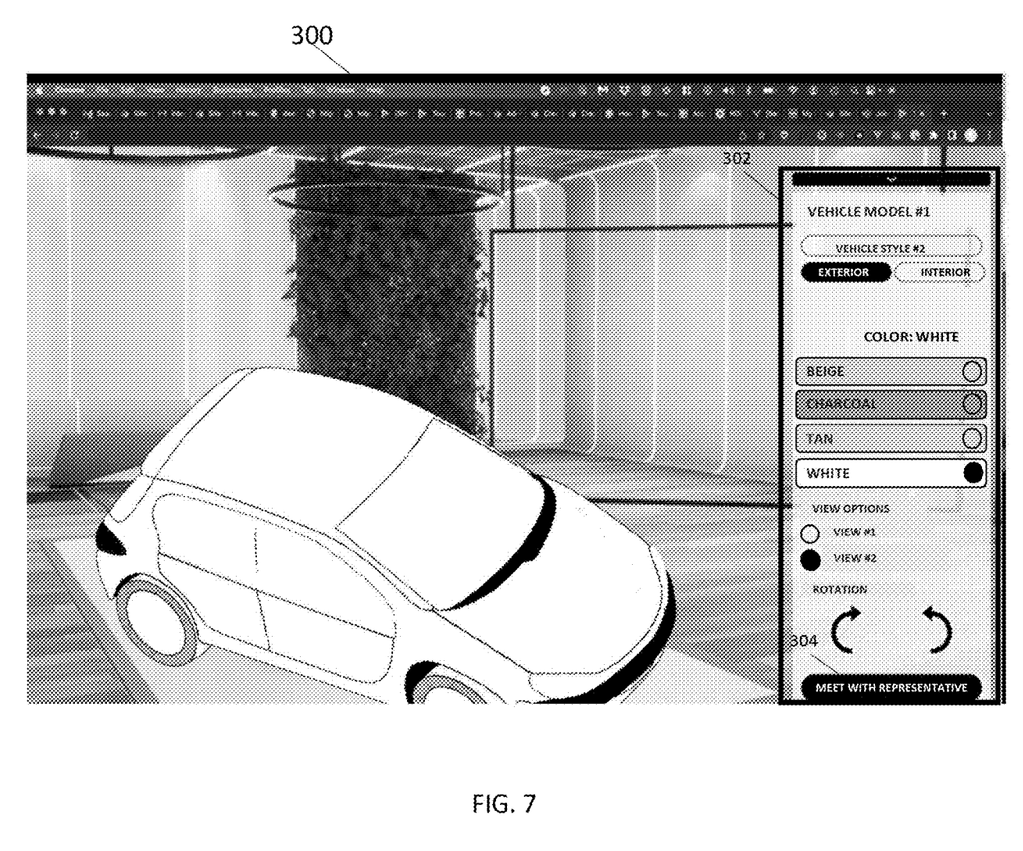

FIG. 7 illustrates other example video content provided in accordance with the present disclosure, including a white-colored vehicle in a different style ("VEHICLE STYLE #2) than that shown in FIGS. 3-6. In addition to a different selected vehicle, the example shown in FIG. 7 illustrates other camera movement, which can include tilt, zoom, pedestal, truck, handheld, pan, or other suitably simulated camera movement.

Figure 8:
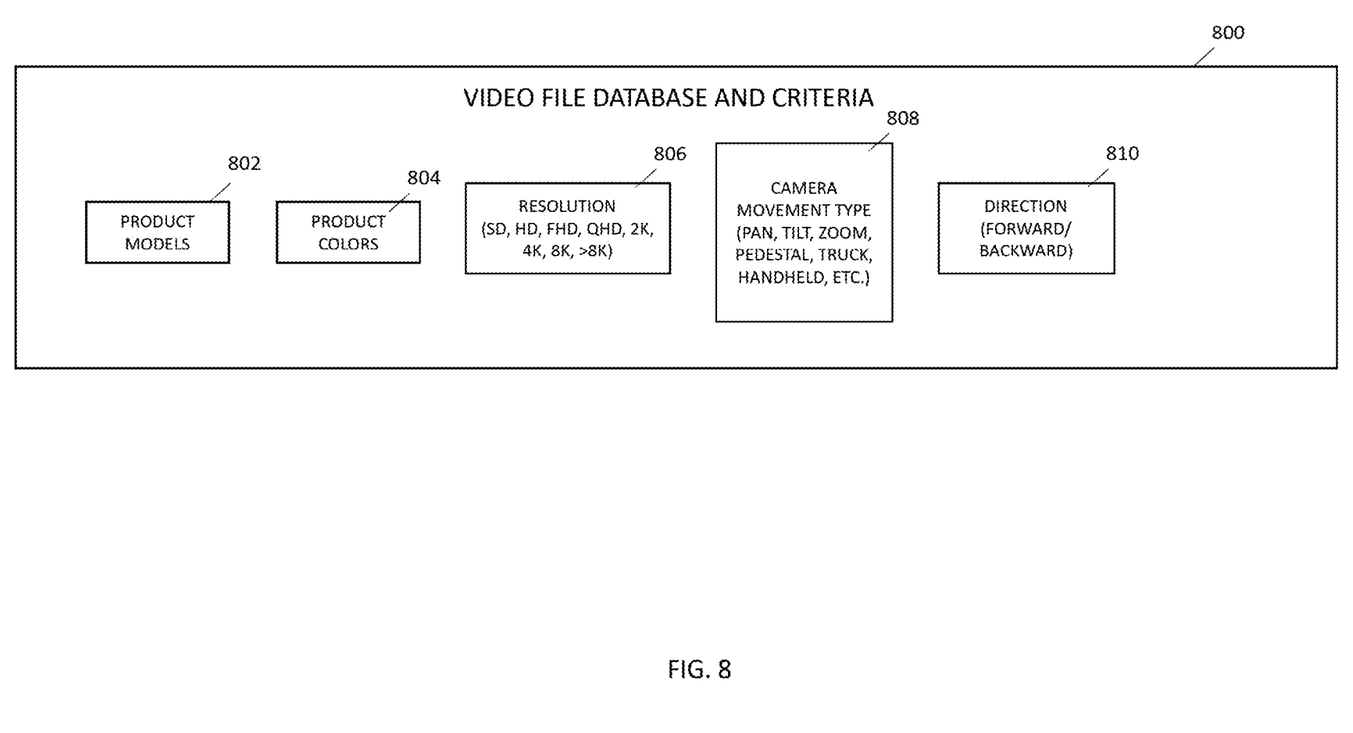
FIG. 8 illustrates an example database, which includes video content of product models, product colors, video resolution, camera movement options, and movement direction, in accordance with an implementation of the present disclosure.

As noted herein, a technical benefit of the present disclosure is the ability to present dynamic and seamless transitions of video content to users with a significantly less requirement for computing resources than, for example, pixel streaming or other process. In one or more implementations, a database of video files (including fragments of video files) can be maintained, for example, by data processing apparatus 102, and played in sequence as dictated by one or more playlists, in accordance with a respective context. FIG. 8 illustrates an example database 800, which includes video content of product models 802, product colors 804, video resolution 806 (e.g., SD, HD, FHD, QHD, 2K, 4K, 8K, or higher). In addition, database 800 can include video content of camera movement 808, and movement direction 810. It is to be appreciated by one of ordinary skill that many variations of database 800 are supported and envisioned herein, for example, in accordance with respective implementations of the present disclosure.

Figure 9:
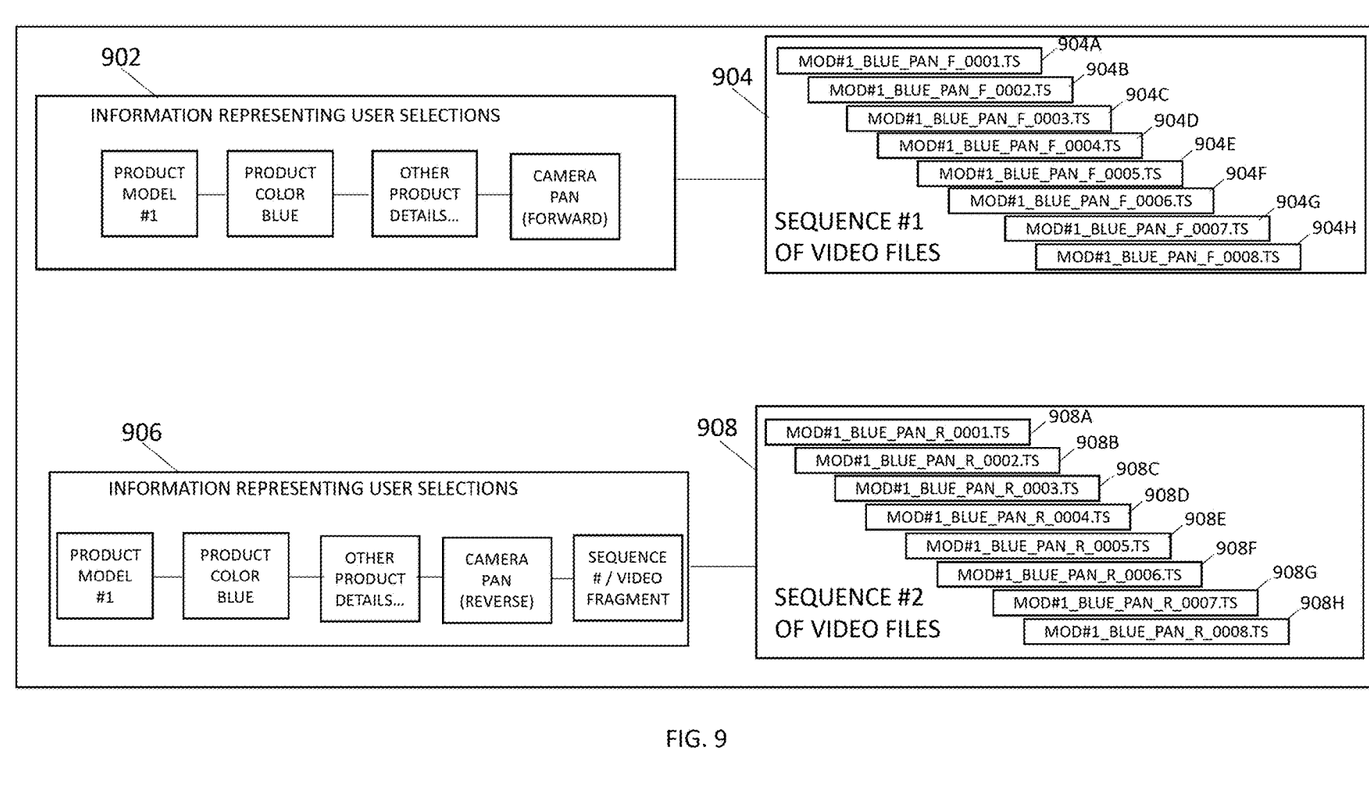
FIG. 9 illustrates two respectively generated playlists based on information received representing selections made by a user, and one or more other types of information representing a respective video sequence (e.g., playlist) and respective video file (e.g., video fragment) playing at the time of the selections, in accordance with an implementation of the present disclosure.

FIG. 9 illustrates two respectively generated playlists based on information received representing the selections made by a user, for example, via GUI 300, and one or more other types of information representing a respective video sequence (e.g., playlist) and respective video file (e.g., video fragment) playing at the time of the selections. In the example shown in FIG. 9, information 902 represents information representing selections received from a respective user computing device 104 regarding a product and configurations thereof. For example, information 902 represents a product model, a product color, and various other product details (e.g., shape, types of features and accessories, or the like). Further, information 902 can include a respective (e.g., default) camera movement, such as pan left to right. One of ordinary skill will appreciate that other, less, or more information associated with selections made by a user via GUI 300 and/or that automatically provided as a function of one or more programming instructions can be included in information 902, in accordance with a particular implementation.

In one or more implementations, once information 902 is received by data processing apparatus 102, a playlist of video files (e.g., video fragments) can be generated to provide video content to be played in GUI 300 on user computing device 104 operated by the user. In the example shown in FIG. 9, a playlist representing a sequence 904 of eight respective .TS video files (904A . . . 904H) provides a selection of video content that, when playing in GUI 300, shows the selected product, including model, color, and other details, panned from left to right. Thereafter, as video in sequence 904 plays and additional user selections are made, such as to change the model, the color, other detail of the product, camera movement direction, or other feature, information 906 representing the additional selections is received by data processing apparatus and processed. Using the information 906, a playlist representing a different sequence 908 of eight other respective .TS video files (908A . . . 908H) for playing in GUI 300 and showing the selected product, including model, color, and other details, as well as changed camera movement or direction. In the example shown in FIG. 9, different video content is provided in GUI 300 that shows the same product model, color, and details, but with the panning reversed (from right to left).

Accordingly, the present disclosure provides for a graphical user interface, including in a portion of a website, in which selections of a product/service can be made, resulting in default video content to play in response. Multiple videos, each associated with a respective product/service, model, color, or other details, as well as with respective video properties (e.g., resolution, file type, or the like), camera movement, or other properties, can be hosted on one or more computing devices and usable in a particular sequence (e.g., playlist). Short, respective video files (e.g., fragments) can play according to a playlist, and as one or more selections is made by a user, such as color change, a selection of a different fragments is selected for playback. The result is a seamless change, such as change in product color or style, in video content. The technical architecture of the present disclosure eliminates the need for extensive GPU and CPU resource requirements that would otherwise be required, such as via pixel streaming, to present dynamically changing video, seamlessly.

In addition to presenting products/services via video content in a respective graphical user interface, the present disclosure includes features for live interactive video conferencing, such as for a user (e.g., consumer) having viewed video content of a product/service shown and described herein and who wishes to engage in a (virtual) face-to-face meeting with another person. The present disclosure provides a set of tools for creating a virtual environment that includes a mixed-reality world of virtual content and live video streams that enables users to be engaged in virtual conferences, including when considering purchasing a product/service.

Figure 10:
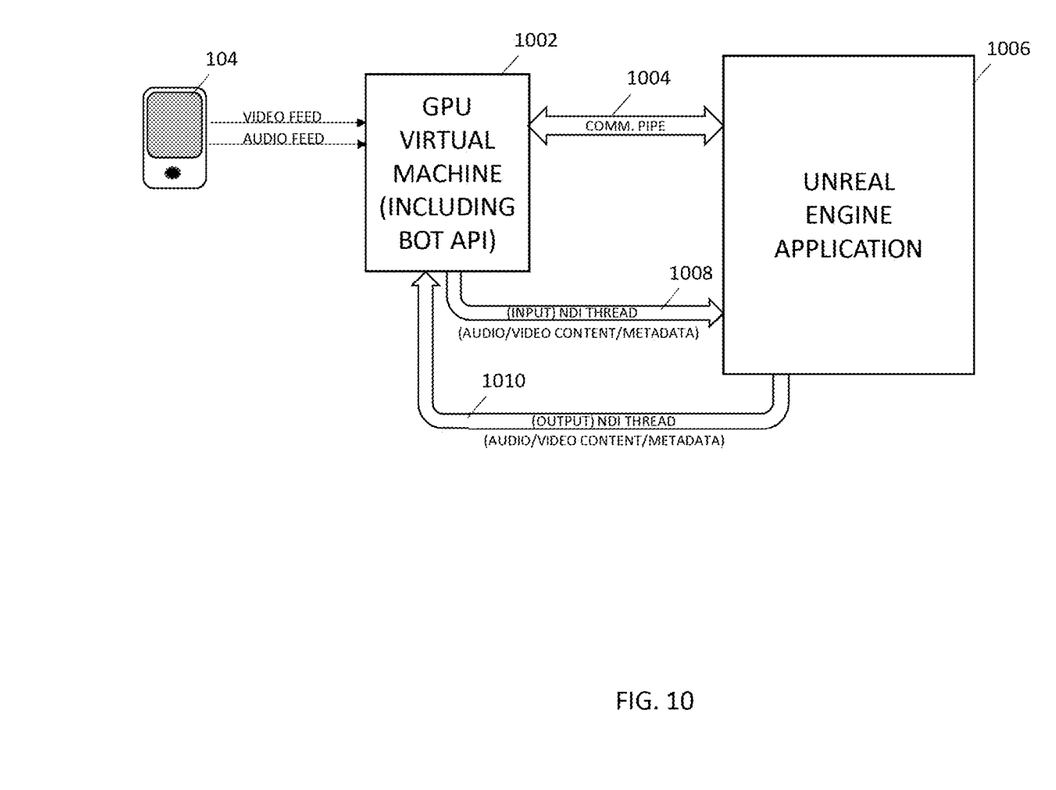
FIG. 10 is a block diagram illustrating a computing technology architecture for providing integrated virtual video content and live video streams and enabling users to be engaged in virtual conferences, in accordance with an implementation of the present disclosure.

Referring now to FIG. 10, a block diagram is provided illustrating a computing technology architecture for providing integrated virtual video content and live video streams, and enabling users to be engaged in virtual conferences, in accordance with an implementation of the present disclosure. In addition to providing one or more options for enabling a user to select features of a product/service for viewing in video, GUI 300 (FIGS. 3-7) can also include an one or more options for a user to engage in a virtual video conference with a representative who can provide additional information and service for a product, including for sales. As shown in FIGS. 3-7, GUI 300 can include graphical screen control 304, in FIGS. 3-7 labeled "MEET WITH REPRESENTATIVE" that, when selected, can cause instructions to be executed by one or more processors to initiate an interactive video conferencing session with one or more individuals (e.g., representatives), such as for additional services associated with the product/service featured in GUI 300. In one or more implementations, a video communications software application can be caused to launch in response selection of control 304 and to connect to one or more computing devices automatically without the user having to supply additional information, such as to identify a respective other computing device, to establish an on-line video conference.

Upon initiating an interactive video conferencing session, such as by selecting control 304 in GUI 300, audio/video feed associated with a microphone and camera configured with the user's computing device is transmitted to one or more computing devices. As illustrated in FIG. 10, the one or more computing devices are configured to provide a GPU virtual machine, which can include a software robot or "bot" and one or more application programming interfaces or "API") 1002. The GPU virtual machine can be configured to receive via one or more computing devices and/or processes the audio/video feed. In operation, the audio/video feed can be passed through one or more neural networks. In accordance with one or more implementations, a graphical 3-D environment can be created and hosted on a computing device a performing graphics processing tasks, including at least in part independently of the computer device's CPU, such as via a graphics processing unit, graphics accelerator, and graphics coprocessor.

In operation, the user who previously selected control 304 can be placed virtually in a 3-D environment as a function of the received audio/video feed using, for example, background removal and other video processing. The user can be virtually rendered in the 3-D environment, and the user can interact with one or more widgets in the in the 3-D environment, such as by selecting graphical controls provided in the 3-D environment. In addition, another party, such as a salesperson or other representative, can be rendered virtually in the 3-D environment in a virtual on-line video conference with the user.

In one or more implementations, a communications pipe 1004 is generated between a high-speed internet application 1006 developed and executing via a graphical development engine, such as the UNREAL engine and the GPU virtual machine 1002. The application developed and/or executing on a graphical development engine via an application programming interface ("API"). Using the established communication pipe 1004, an input NDI thread 1008 and an output NDI thread 1010 can be used for transmitting audio/video content as well as various information (e.g., metadata) between the application 1006 and the virtual machine 1002.

More particularly, a rendering plug-in can be provided, which enables A/V feeds from each of a plurality of computing devices to be received via the communications pipe 1004 to the graphical development engine application 1006. For example, a programmed software robot (e.g., a "bot") is configured to join a video conference session, such as via the plug-in. The bot can be configured by programming instructions that, when executed, enable the graphical development engine application to determine various kinds of information, such as the number of devices connected to the video conference, which of the connected devices is being operated by a user who is actively speaking or otherwise participating in the video conference, when a change occurs such as a different user beginning to speak, when the current speaker mutes his/her microphone, when a user begins screen sharing, or some other action occurs. As such events occur, one or more messages can be transmitted to one or more computing devices and, thereafter, received and processed by the graphical development engine application. For example, a user of computing device configured with the plug-in (or other suitable software instructions) connects to a video conferencing session. A message can be transmitted via a back-end API that enables the user to join the 3-D environment, for example, that includes a name of an NDI thread. A back-end process generates an NDI thread and broadcasts the audio/video content over the NDI thread.

In one or more implementations, the graphical development engine application 1008 searches for the generated NDI thread 1008 and, once located, creates an abstraction (e.g., a source) for a placeholder in the respective 3-D environment for broadcast. In one or more implementations, the audio/video feed from a user computing device can be passed through a neural content, for example, for segmentation. A plugin, for example for the graphical development engine on each rendering frame takes output of the rendered audio/video frame, creates an output NDI thread which the graphical development engine application 1006 is listening for. Once identified, the graphical development engine application 1006 can take the content in the output NDI thread and broadcast it directly to the respective session to which the bot is connected. It is to be appreciated by one of ordinary skill that other implementations and designs can be provided, and are envisioned and supported by the teachings herein.

Accordingly, the present disclosure includes a two-stage presentation of products/services, which provides for greater sales options details and granularity. In a first stage, a user can interact dynamically with video content of a product/service, without interacting with any other people. With additional interest, the user can instigate a second stage that includes a live-virtual video conference in a rendered 3-D environment, which can enable a salesperson, for example, opening doors of a vehicle, operating demonstrating dashboard vehicles, or other activity. In one or more implementations, the second stage can be provided in a graphical environment that includes at least some of the same content as that provided in the first stage. For example, as a user selects control 304 to implement a virtual conference, information regarding the respective video (e.g., playlist) and respective content (e.g., fragment) playing at the time can be transmitted and the video content can continue in the second stage at the same place/format as provided in the first stage. This can provide the user with a seamless experience notwithstanding the user's computing device leaving one data communication session (e.g., with a web server providing GUI 300) and joining a different one (e.g., via virtual machine 1002).

While operations shown and described herein may be in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method for providing interactive video content, the method comprising:
  storing, by at least one computing device, a plurality of distinct and respective sequences of video content;
  categorizing, by at least one computing device, each of the plurality of distinct and respective sequences of video content, wherein:
    each of the respective sequences of video content relates to the other of the plurality of distinct and respective sequences of video content via at least one category,
    each of the respective sequences of video content comprises a plurality of video files, and
    each of the plurality of video files is a discrete section of at least one of the respective sequences of video content;
  providing, by at least one computing device via a graphical user interface, a prompt for ones of the plurality of distinct and respective sequences of video content;
  receiving, by at least one computing device in response to the prompt via the graphical user interface, a first selection representing a first selected one of the plurality of respective sequences of video content;
  providing, by at least one computing device via the graphical user interface in response to the first selection, a first video file of the plurality video files comprised in the first selected one of the plurality of respective sequences of video content;
  providing, by at least one computing device via the graphical user interface, a second video file of the plurality video files comprised in the first selected one of the plurality of respective sequences of video content;
  receiving, by at least one computing device via the graphical user interface in response to the prompt, a second selection representing a second selected one of the plurality of respective sequences of video content;
  identifying, by at least one computing in response to receiving the second selection, a second video file of the plurality of video files comprised in the second selected one of the plurality of respective sequences of video content that corresponds to the second video file of the plurality video files comprised in the first selected one of the plurality of respective sequences of video content;
  providing, by at least one computing device via the graphical user interface, the second video file of the plurality video files comprised in the second selected one of the plurality of respective sequences of video content, wherein providing the second video file of the plurality video files comprised in the second selected one of the plurality of respective sequences of video content appears seamlessly.

2. The method of claim 1, wherein the first selected one and the second selected one of the plurality of respective sequences of video content regards a product and/or service offered for sale.

3. The method of claim 2, further comprising:
  providing, by at least one computing device via a graphical user interface, a prompt for an interactive video conference with a person.

4. The method of claim 3, further comprising:
  providing, by at least one computing device, via the graphical user interface, the interactive video conference with the person.

5. The method of claim 1, wherein video content is provided via hypertext transport protocol live streaming.

6. The method of claim 1, further comprising:
  generating, by at least one computing device in response to receiving the first selection representing a first selected one of the plurality of respective sequences of video content, a playlist of video files comprised in the first selected one of the plurality of respective sequences of video content,
  wherein the first video file and the second video file of the plurality video files comprised in the first selected one of the plurality of respective sequences of video content are provided via the playlist.

7. The method of claim 1, wherein the first selected one of the plurality of respective sequences of video content is provided in a first order.

8. The method of claim 7, wherein the second selected one of the plurality of respective sequences of video content is provided in reverse of the first order.

9. The method of claim 1, further comprising:
converting, by at least one computing device, each of the first and second selected ones of the plurality of respective sequences of video content from a first format to a second format.

10. The method of claim 9, wherein the first format is MP4 and the second format is TS.

11. A computer-implemented system for providing interactive video content, the system comprising:
at least one computing device configured by executing code stored on non-transitory processor readable media wherein, when executing the code, the at least one computing device is configured to:
store a plurality of distinct and respective sequences of video content;
categorize each of the plurality of distinct and respective sequences of video content, wherein:
each of the respective sequences of video content relates to the other of the plurality of distinct and respective sequences of video content via at least one category,
each of the respective sequences of video content comprises a plurality of video files, and
each of the plurality of video files is a discrete section of at least one of the respective sequences of video content;
provide, via a graphical user interface, a prompt for ones of the plurality of distinct and respective sequences of video content;
receive, in response to the prompt via the graphical user interface, a first selection representing a first selected one of the plurality of respective sequences of video content;
provide, via the graphical user interface in response to the first selection, a first video file of the plurality video files comprised in the first selected one of the plurality of respective sequences of video content;
provide, via the graphical user interface, a second video file of the plurality video files comprised in the first selected one of the plurality of respective sequences of video content;
receive, via the graphical user interface in response to the prompt, a second selection representing a second selected one of the plurality of respective sequences of video content;
identify, in response to receiving the second selection, a second video file of the plurality of video files comprised in the second selected one of the plurality of respective sequences of video content that corresponds to the second video file of the plurality video files comprised in the first selected one of the plurality of respective sequences of video content;
provide, via the graphical user interface, the second video file of the plurality video files comprised in the second selected one of the plurality of respective sequences of video content, wherein providing the second video file of the plurality video files comprised in the second selected one of the plurality of respective sequences of video content appears seamlessly.

12. The computer-implemented system of claim 11, wherein the first selected one and the second selected one of the plurality of respective sequences of video content regards a product and/or service offered for sale.

13. The computer-implemented system of claim 12, wherein, when executing the code, the at least one computing device is configured to:
provide, via a graphical user interface, a prompt for a live video conference with a person.

14. The computer-implemented system of claim 13, wherein, when executing the code, the at least one computing device is configured to:
provide, via a graphical user interface, the interactive video conference with the person.

15. The computer-implemented system of claim 11, wherein video content is provided via hypertext transport protocol live streaming.

16. The computer-implemented system of claim 11, wherein, when executing the code, the at least one computing device is configured to:
generate, in response to receiving the first selection representing a first selected one of the plurality of respective sequences of video content, a playlist of video files comprised in the first selected one of the plurality of respective sequences of video content,
wherein the first video file and the second video file of the plurality video files comprised in the first selected one of the plurality of respective sequences of video content are provided via the playlist.

17. The computer-implemented system of claim 11, wherein the first selected one of the plurality of respective sequences of video content is provided in a first order.

18. The computer-implemented system of claim 17, wherein the second selected one of the plurality of respective sequences of video content is provided in reverse of the first order.

19. The computer-implemented system of claim 11, wherein, when executing the code, the at least one computing device is configured to:
converting, by at least one computing device, each of the first and second selected ones of the plurality of respective sequences of video content from a first format to a second format.

20. The computer-implemented system of claim 19, wherein the first format is MP4 and the second format is TS.

* * * * *